(12) United States Patent
Wagner et al.

(10) Patent No.: US 8,109,139 B2
(45) Date of Patent: Feb. 7, 2012

(54) METHOD AND SYSTEM FOR MONITORING TIRE PRESSURE

(75) Inventors: Markus Wagner, Ludwigsburg (DE); Karsten Sandrock, Bretten (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 0 days.

(21) Appl. No.: 12/851,531

(22) Filed: Aug. 5, 2010

(65) Prior Publication Data

US 2011/0041596 A1 Feb. 24, 2011

(30) Foreign Application Priority Data

Aug. 19, 2009 (DE) .................. 10 2009 038 100

(51) Int. Cl.
*B60C 23/02* (2006.01)

(52) U.S. Cl. ........................ 73/146.5; 702/77

(58) Field of Classification Search .................. None
See application file for complete search history.

(56) References Cited

U.S. PATENT DOCUMENTS

| 5,181,423 | A * | 1/1993 | Philipps et al. ................. 73/724 |
| 7,464,587 | B2 * | 12/2008 | Schulze et al. .................. 73/146 |
| 2001/0008083 | A1 * | 7/2001 | Brown .............................. 73/146 |
| 2002/0003474 | A1 * | 1/2002 | McClelland et al. ......... 340/442 |
| 2002/0190852 | A1 | 12/2002 | Lin |
| 2005/0000278 | A1 * | 1/2005 | Haralampu et al. ............ 73/146 |
| 2005/0052286 | A1 | 3/2005 | Perraud et al. |
| 2005/0110623 | A1 | 5/2005 | Schulze et al. |
| 2006/0273889 | A1 * | 12/2006 | Schulze et al. ................. 340/445 |
| 2007/0186635 | A1 * | 8/2007 | Fujioka et al. .................. 73/146 |
| 2008/0150711 | A1 | 6/2008 | Mori et al. |
| 2010/0250170 | A1 * | 9/2010 | Kalinin et al. .................. 702/77 |

* cited by examiner

*Primary Examiner* — Andre Allen

(57) ABSTRACT

The invention relates to a method for monitoring air pressure in vehicle tires using wheel electronics, which comprise a pressure sensor for measuring the air pressure present in the tire, a transmitter for transmitting pressure information, and a receiver for receiving interrogation signals, wherein a transmission activity of the wheel electronics is triggered by the reception of an interrogation signal, which is transmitted as a pulse train comprising a command section that encodes a transmission instruction for the wheel electronics. According to the invention, the pulse train comprises an adjustment section having several pulses before the command section.

17 Claims, 1 Drawing Sheet

METHOD AND SYSTEM FOR MONITORING TIRE PRESSURE

In order to monitor the tire pressure in motor vehicles, devices are used which comprise a sensor for measuring the pressure and a transmitter for wirelessly transmitting pressure information. These devices are generally referred to as wheel electronics and are disposed in the pneumatic tires. Wheel electronics can be attached to a valve base or to the rim, for example.

The pressure information transmitted by the wheel electronics can be received by a receiver mounted in or on the vehicle. Such tire pressure monitoring systems can indicate insufficient air pressure in a vehicle tire or a dangerous drop in pressure to a driver. Wheel electronics in which the transmission activity can be triggered by the reception of an interrogation signal are particularly advantageous. In such wheel electronics, a central unit disposed on the vehicle can obtain information, when needed, about the individual vehicle tires by interrogating the wheel electronics.

Regardless of whether wheel electronics cover the energy demand thereof from a battery or a mechanical-electric or thermo-electric converter, achieving the most economical energy consumption possible is a constant objective that is pursued in the development and improvement of wheel electrics.

It is therefore an object of the present invention to identify a way as to how the energy consumption of wheel electronics can be reduced.

This object is achieved by a method having the features listed in claim 1 and by a tire pressure monitoring system according to claim 15. Advantageous refinements of the invention are the subject matter of the dependent claims.

SUMMARY OF THE INVENTION

In a method according to the invention, a pulse train, which comprises an adjustment section having several pulses before a command section encoding a transmission instruction, is used as an interrogation signal. In this way, an amplification factor, which is used to amplify the pulses of the interrogation signal, can be adjusted in the wheel electronics to a degree that is required for receiving and evaluating the command section. The reception conditions for the interrogation signal depend on a number of factors, including the vehicle-specific geometry of the wheel house, and are therefore subject to considerable fluctuations. With the method according to the invention, the amplification can be reduced to the degree necessary for the reception conditions in the specific case. This enables a more economical operation of the wheel electronics.

The adjustment section preferably comprises three to ten pulses, with three to seven pulses being particularly preferred. This measure has the advantage that not only a sufficient number of pulses is available in order to reliably determine the necessary amplification factor, but also that an unnecessarily long reception activity can be avoided.

The reception conditions, and therefore the necessary amplification, can be determined particularly well at the edges of pulses. As a result, short pulses are advantageous for the adjustment section. The pulses of the adjustment section preferably have equal lengths within the context of system accuracy. For example, the pulses of the adjustment section can all have one length, which encodes the value zero in the bit string present in the command section.

The command section preferably comprises pulses which are longer than the pulses of the adjustment section, in particular pulses which are at least twice as long as the pulses of the adjustment section. Thereby the command section may also comprise pulses which are as long as, or even shorter than, the pulses of the adjustment section. The command section, for example, can be a bit string, wherein long pulses encode the value 1 and short pulses the value zero. In this case, the short pulses preferably have the same lengths as the pulses of the adjustment section.

According to an advantageous refinement of the invention, between the adjustment section and the command section, the pulse train comprises a start pulse, which is at least twice as long, preferably at least three times as long, in particular at least four times as long, as the pulses present in the adjustment section. The start pulse is preferably also longer than the pulses present in the command section. In this way, it is possible to prevent the last pulse of the adjustment section from being accidentally interpreted as a pulse of the command section. For example, the start pulse can be longer than a pulse encoding a 1, and also longer than a pulse encoding a 0. The start pulse is preferably at least as long as the sum of the pulse durations of a pulse of the adjustment section and a pulse of the command section. For example, the start pulse can be equal in length, preferably longer, than the sum of a pulse describing a 0 and a pulse describing a 1 of the command section.

According to a further advantageous refinement of the invention, the pulse train comprises a wake-up pulse before the adjustment section. The wake-up pulse is preferably longer than the adjustment section. The wake-up pulse can advantageously be used to keep wheel electronics from being continuously ready to receive. Because the pulse train forming an interrogation signal comprises a wake-up pulse at the beginning, it suffices if wheel electronics check at regular intervals whether an intensity that is characteristic of a pulse is present at the receiver. If this is the case, the receiver remains ready to receive in order to receive the subsequent sections of the interrogation signal. If this is not the case, the wheel electronics can return into an energy-saving state. In a particularly preferred embodiment, the duration of the wake-up pulse accounts for more than half, such as at least two thirds, of the duration of the pulse train.

The transmitter present in the wheel electronics is preferably an HF transmitter, this being a radio-frequency transmitter. The wheel electronics thus transmit pressure information in the form of radio-frequency signals. The transmission is preferably carried out at more than 100 MHz, such as 433 MHz, referred to as the ISM band, or in the 315 MHz region or in the 868 MHz region. For the interrogation signals, the low-frequency range (LF) is preferred. The range between 50 kHz and 300 kHz is particularly suited. The pulse train of the interrogation signal can be generated in that a carrier wave is pulse width modulated in the above-mentioned frequency range, such as by switching the transmitter on and off.

BRIEF DESCRIPTION OF THE DRAWINGS

Further details and advantages of the invention will be described in an exemplary embodiment with reference to the attached drawing. Shown are.

DETAILED DESCRIPTION

Figure 1:
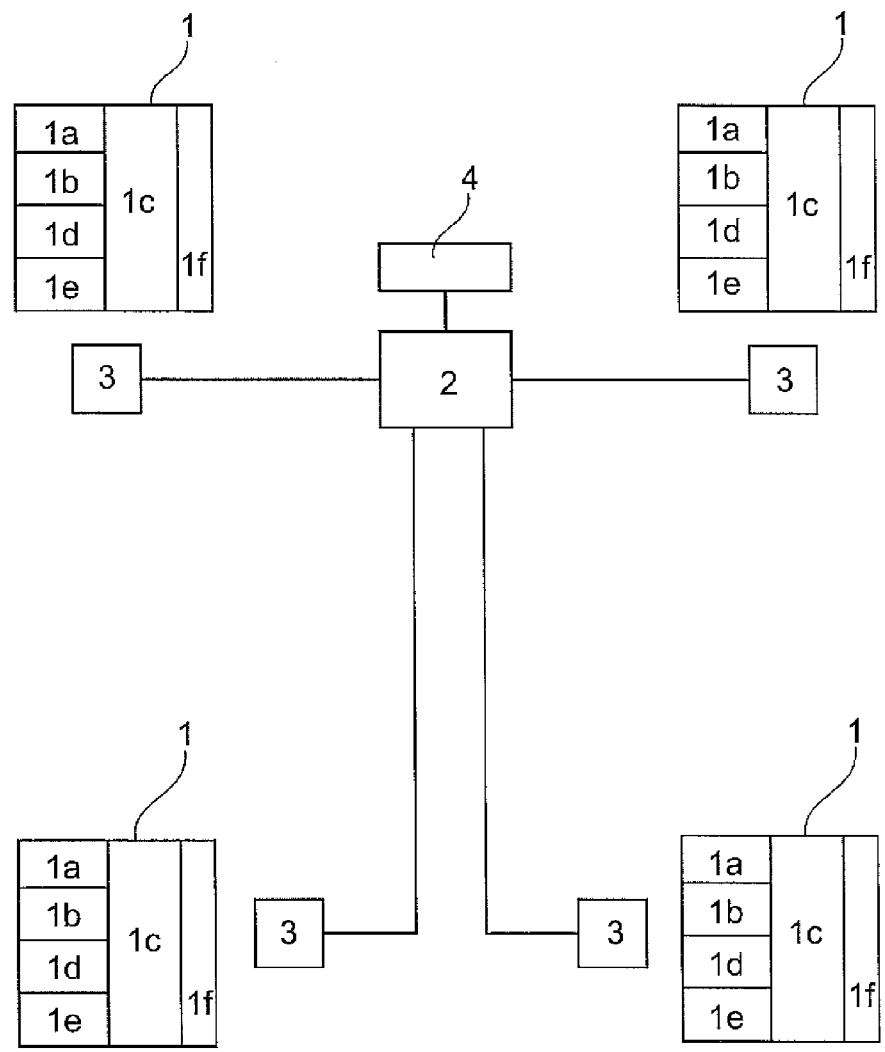
FIG. 1 is a schematic illustration of a tire pressure monitoring system.

The system illustrated in FIG. 1 for monitoring the tire pressure in vehicles comprises a plurality of wheel electronics 1, which in each case are disposed in one of the pneumatic tires of a vehicle, and a pressure sensor 1a, a temperature sensor 1b, a control unit 1c, a power source 1d, such as a battery or a generator, an HF transmitter 1e, and an LF receiver 1f. The system furthermore comprises a central unit 2, which is disposed on the vehicle in a stationary manner and to which the interrogation transmitter 3 and at least one HF receiver 4 are connected.

Since the interrogation transmitters 3 emit LF signals having a carrier frequency of 50 kHz to 300 kHz, for example, in particular of 100 kHz to 150 kHz, the interrogation signals 10 have a relatively short range. Each end of a vehicle axle is therefore preferably associated with an interrogation transmitter 3 in order to interrogate the wheel electronics 1 of the wheels disposed at the particular ends of the vehicle axles.

In contrast, the wheel electronics emit pressure information in the form of HF signals. The HF carrier frequency used is preferably at least 100 MHz. For example, 433 MHz, 315 MHz or 868 MHz are common for wheel electronics 1. The signals emitted by the wheel electronics 1 therefore have a larger range, so that generally a single receiver 4 suffices, which is connected to the central unit 2. However, it is also possible to connect a plurality of receivers 4 to the central unit 2 and, for example, to associate a dedicated receiver 4 with each axle or even each wheel position.

Figure 2:
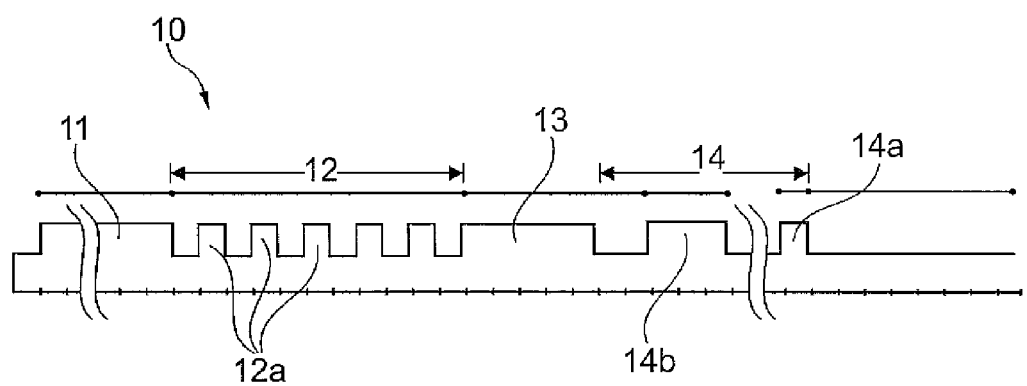
FIG. 2 is a schematic illustration of the pulse train of an interrogation signal.

A transmission activity of the wheel electronics 1 is triggered by the reception of an interrogation signal 10. The interrogation signal 10 is transmitted in the form of a pulse train, which is illustrated schematically in FIG. 2.

The interrogation signal 10 starts with a wake-up pulse 11. The wake-up pulse 11 is followed by an adjustment section 12, which comprises several, for example five, pulses 12a. The adjustment section is followed by a start pulse 13, which is followed by a command section 14 encoding a transmission instruction for the wheel electronics 1. The command section 14, for example, can prompt the wheel electronics 1 to emit current pressure information. Another possibility is that the command section 14 prompts the wheel electronics 1 to emit type information, such as the version of the software it contains.

In the illustrated embodiment, the wake-up pulse 11 accounts for more than half the duration of the pulse train 10. The wake-up pulse 11 is longer than the adjustment section 12, and it is also longer than the command section 14. The wake-up pulse 11 is preferably longer than the sum of the duration of the command section 14 and of the duration of the adjustment section 12. The longer the wake-up pulse 11, the rougher the sampling can be in the wheel electronics. As a result, the longer the wake-up pulse, the lower is the energy requirement and also the susceptibility of the wheel electronics to interference. An upper limit for the maximum length of the wake-up pulse is defined by the desired response time of the system.

The wheel electronics 1 periodically activate the receiver 1f in order to check whether an interrogation signal 10 is active. By selecting the time intervals during which the receiver 1f of the wheel electronics 1 is activated shorter than the wake-up pulse 11, it takes little energy expenditure for the wheel electronics 1 to be ready to receive during the adjustment section 12 of the interrogation signal 10.

In order to determine whether a wake-up pulse 11 is active, it suffices to activate the receiver 1f of the wheel electronics 1 for a very short time, such as for ½ ms or less. The energy this requires is very low, since the receiver if of the wheel electronics 1 is shut off the majority of the time. The receiver 1f of the wheel electronics 1 is preferably activated at time intervals amounting to at least ⅔, preferably at least ¾, of the duration of the wake-up pulse 11, but less than the duration of the wake-up pulse 11.

In the illustrated embodiment, the receiver is activated every 32 ms for less than ½ ms. In the illustrated embodiment, the duration of the wake-up pulse 11 is 42 ms. The duration of the wake-up pulse 11 can also be selected longer or shorter without difficulty. However, it must be taken into account that the wheel electronics 1 require more frequent activation the shorter the wake-up pulse 11 is. A longer wake-up pulse 11 has the advantage of a more economical operation of the wheel electronics 1, however means that accordingly more time is required to interrogate the wheel electronics 1 with respect to pressure information. A particularly advantageous range for the duration of the wake-up pulse 11 is between 30 and 200 ms, particularly 35 to 100 ms.

The adjustment section 12 follows the wake-up pulse 11 and has several pulses 12a. The adjustment section 12 preferably comprises three to ten pulses 12a, with three to seven being particularly preferred. The pulses 12a present in the adjustment section 12 are used to adapt the signal amplification to the prevailing reception conditions, so that the wheel electronics 1 can understand and evaluate the command section 14 of the interrogation signal 10 without error. By adjusting the amplification factor of an amplifier present in the receiver 1f of the wheel electronics 1 to the necessary extent, a particularly energy-saving operation of the wheel electronics 1 can be implemented, because unnecessarily high signal amplification can be avoided.

The pulses 12a of the adjustment section 12 preferably have equal lengths within the context of system accuracy. For example, the pulses 12a of the adjustment section can have a length which is used in the command section 14 to describe a zero.

Between the adjustment section 12 and the command section 14, the pulse train comprises the start pulse 13. The start pulse 13 prevents the wheel electronics 1 from interpreting pulses 12a of the adjustment section 12 as part of the command section 14. The start pulse 13 is at least twice as long, preferably three times as long, in particular at least four times as long, as pulses 12a present in the adjustment section 12. In the illustrated embodiment, the start pulse 13 is five times as long as the pulses 12a of the adjustment section 12. The start pulse 13 is preferably also longer than the pulses 14a, 14b present in the command section 14. It is particularly preferred when the start pulse 13 is at least as long as the sum of the pulse durations of a pulse 12a of the adjustment section 12 and a pulse 14a, 14b of the command section 14. In general, it is advantageous when the start pulse 13 is three to ten times as long as a pulse 12a of the adjustment section 12, particularly four to six times as long as a pulse 12a of the adjustment section 12.

The command section 14 follows the start pulse 13. The command section 14 preferably comprises a bit string in the form of short pulses 14a and long pulses 14b. To this end, short pulses 14a can encode a zero and long pulses 14b can encode a one. As was already mentioned, the lengths of the short pulses 14a of the command section 14 can correspond to those of the pulses 12a of the adjustment section 12.

The wheel electronics 1 described above may comprise a roller switch, which is closed by acceleration forces developing while driving. Advantageously, the wheel electronics 1 can then automatically perform pressure measurements at specified time intervals during travel. When the wheel electronics 1 find a dangerous drop in pressure, corresponding pressure information can be sent even without a request by an interrogation signal. Wheel electronics 1 which not only can be prompted into transmission by an interrogation signal 10, but are also able to automatically transmit, are known from DE 102 17 239 A1, for example.

REFERENCE NUMERALS

1 Wheel electronics
1*a* Pressure sensor
1*b* Temperature sensor
1*c* Control unit
1*d* Power source
1*e* HF transmitter
1*f* LF receiver
2 Central unit
3 Interrogation transmitter
4 HF receiver
5 Adjustment section
10 Interrogation signal
11 Wake-up pulse
12 Adjustment section
12*a* Pulse
13 Start pulse
14 Command section
14*a* Short pulse
14*b* Long pulse

What is claimed is:

1. A method for monitoring air pressure in vehicle tires using wheel electronics, the method comprising:
    measuring air pressure present in the tire;
    transmitting pressure information; and
    receiving interrogation signals, a transmission activity of the wheel electronics being triggered by reception of an interrogation signal, transmitted as a pulse train comprising a command section encoding a transmission instruction for the wheel electronics,
    wherein the pulse train comprises an adjustment section having several pulses before the command section.

2. The method according to claim 1, wherein the command section comprises pulses which are longer than the pulses present in the adjustment section.

3. A method according to claim 1, wherein the command section comprises pulses which are at least twice as long than the pulses of the adjustment section.

4. A method according to claim 1, wherein the command section comprises a bit string in the form of short and long pulses.

5. The method according to claim 4, wherein the adjustment section is formed as a train of short pulses, the lengths of which correspond to the short pulses of the command section.

6. A method according to claim 1, wherein the adjustment section comprises three to ten, preferably three to seven pulses.

7. A method according to claim 1, wherein, between the adjustment section and the command section, the pulse train comprises a start pulse, which is at least twice as long, preferably at least three times as long, in particular at least four times as long, as the pulses present in the adjustment section.

8. The method according to claim 7, wherein the start pulse is longer than the pulses present in the command section.

9. The method according to claim 7, wherein the start pulse is at least as long as the sum of the pulse durations of a pulse of the adjustment section and a pulse of the command section.

10. A method according to claim 7, wherein the start pulse is three to ten times as long as a pulse of the adjustment section, preferably four to six times as long as a pulse of the adjustment section.

11. A method according to claim 1, wherein the pulse train comprises a wake-up pulse before the adjustment section.

12. The method according to claim 11, wherein the wake-up pulse is longer than the adjustment section.

13. The method according to claim 11, wherein the wake-up pulse is longer than the command section.

14. A method according to claim 11, wherein the wake-up pulse is longer than the sum of the durations of the command section and the adjustment section.

15. A method according to claim 11, wherein the duration of the wake-up pulse accounts for more than half of the duration of the pulse train.

16. A tire pressure monitoring system, comprising:
    wheel electronics having a pressure sensor for measuring the air pressure present in the tire;
    a transmitter for transmitting pressure information;
    a receiver for receiving interrogation signals;
    an interrogation transmitter for emitting interrogation signals, and
    a receiver for receiving pressure information, a transmission activity of the wheel electronics being triggered by reception of an interrogation signal, transmitted as a pulse train comprising a command section encoding a transmission instruction for the wheel electronics,
    wherein the pulse train comprises an adjustment section having several pulses preceding the command section.

17. The system according to claim 16, wherein the receiver of the wheel electronics comprises an amplifier, and wherein the pulses present in the adjustment section are used to adjust an amplification factor required for evaluating the command section.

* * * * *